United States Patent

[11] 3,621,212

| [72] | Inventors | James Hobbs<br>Overland Park, Kans.;<br>Earl Stuart Perkins, Oak Brook, Ill.;<br>Donald E. Floyd, Independence, Mo. |
|---|---|---|
| [21] | Appl. No. | 789,433 |
| [22] | Filed | Jan. 7, 1969 |
| [45] | Patented | Nov. 16, 1970 |
| [73] | Assignee | Butler National Corporation<br>Minneapolis, Minn. |

[54] DIRECTION AND GROUND SPEED COMPUTER
11 Claims, 5 Drawing Figs.

[52] U.S. Cl. .................................................. 235/150.27, 235/150.2, 324/160, 343/112 S
[51] Int. Cl. .................................................. G06g 7/78
[50] Field of Search .......................................... 235/150.2, 150.27; 343/107, 112 S

[56] References Cited
UNITED STATES PATENTS

| 2,784,908 | 3/1957 | Gray et al. | 235/150.27 |
| 3,021,068 | 2/1962 | Ostroff | 235/150.27 X |
| 3,034,724 | 5/1962 | Perkins | 235/150.27 X |
| 3,205,346 | 9/1965 | Wright et al. | 235/150.271 |
| 3,398,267 | 8/1968 | Hattendorf | 235/150.26 |
| 3,413,597 | 11/1968 | Crow | 235/150.27 X |
| 3,469,079 | 9/1969 | Stansbury | 235/150.23 |
| 3,495,241 | 2/1970 | Perkins | 343/107 |

*Primary Examiner*—Eugene G. Botz
*Assistant Examiner*—Felix D. Gruber
*Attorney*—Hill, Sherman, Meroni, Gross & Simpson ABSTRACT: An aircraft heading and ground speed computer which utilizes the output of a way point computer and converts the X and Y distances to the way point to X and Y velocities and combines them to obtain the resultant ground speed. The track made good may also be obtained from the X and Y velocity components. A system for calculating the wind speed and direction is also disclosed.

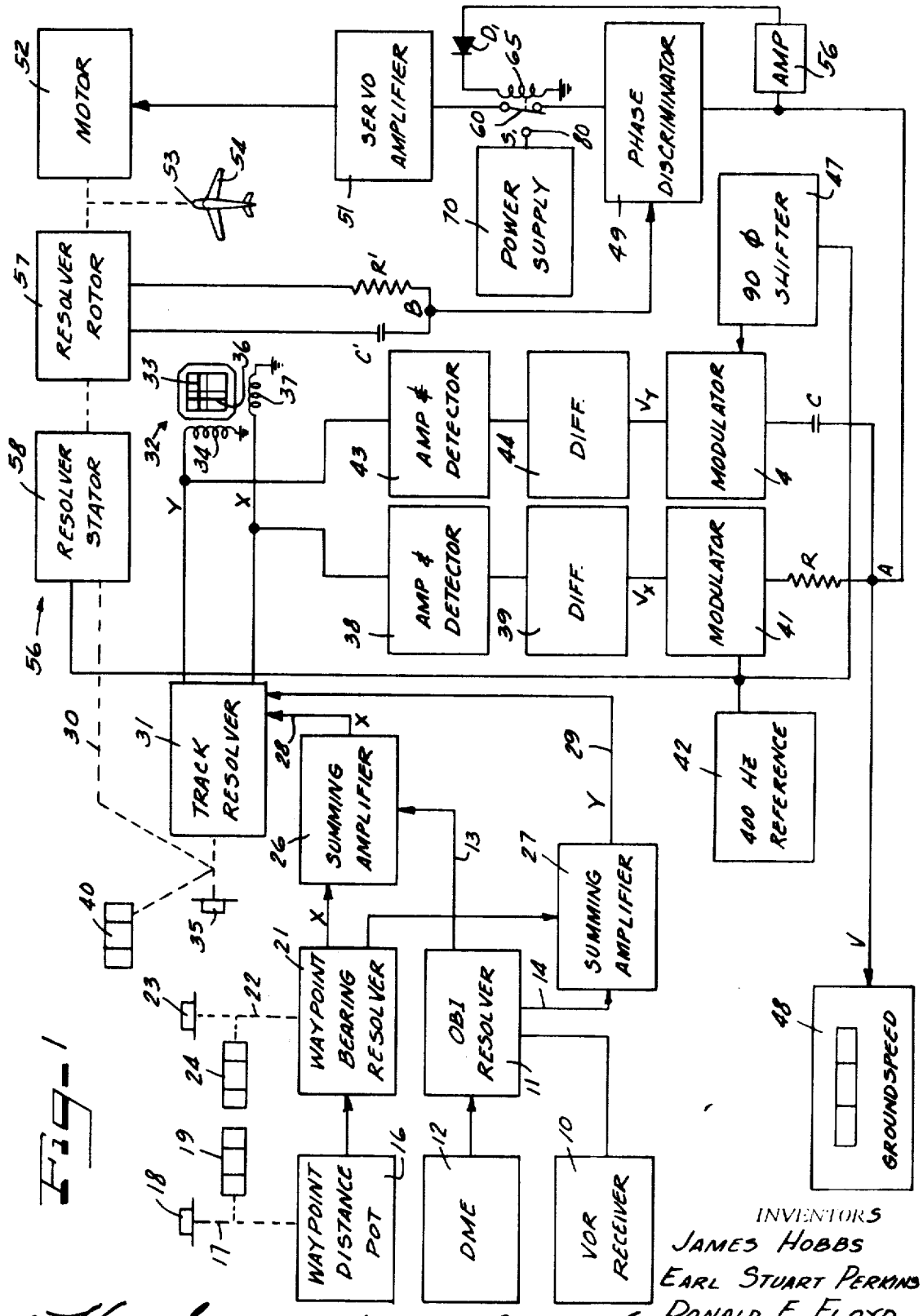

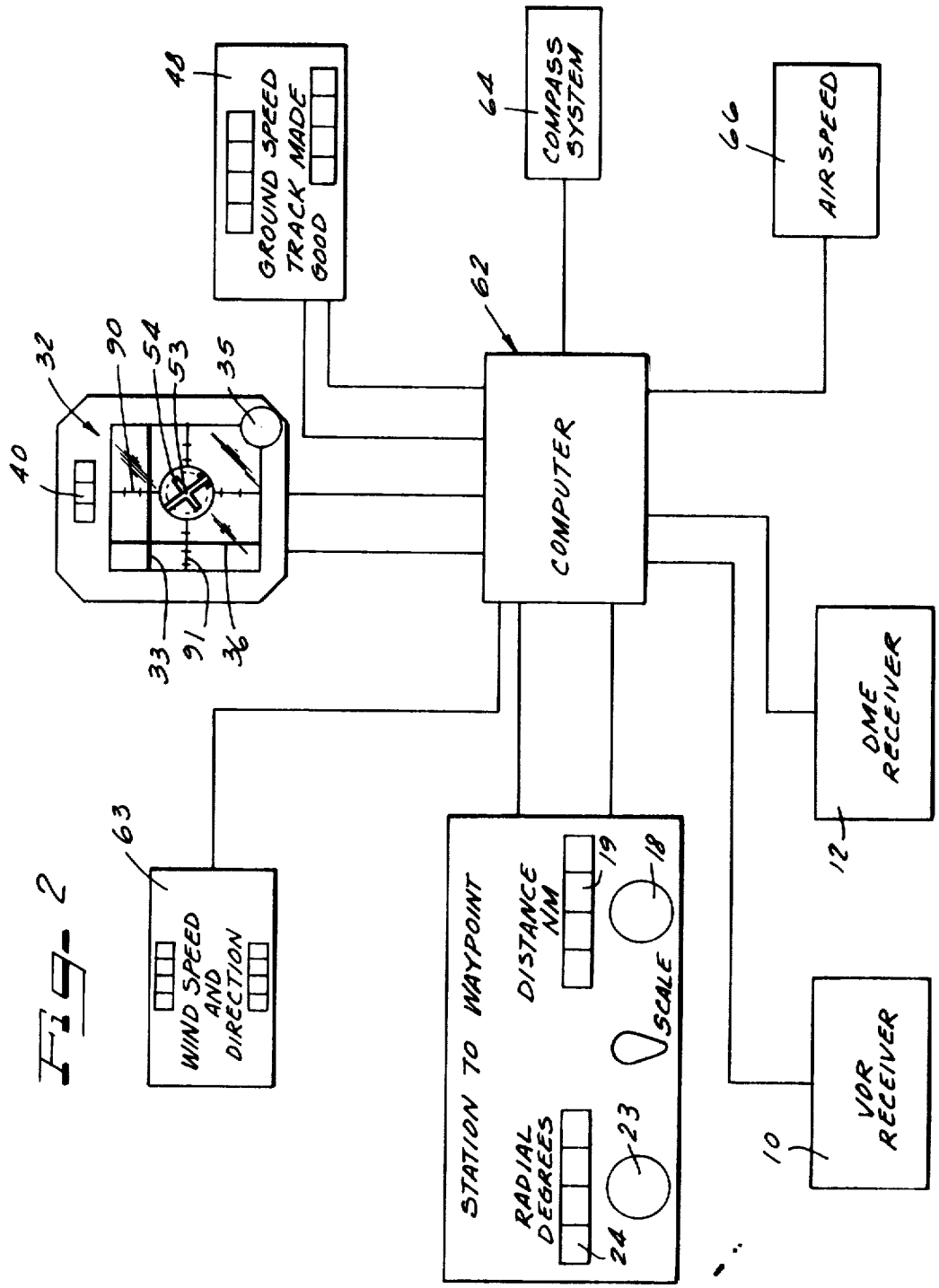

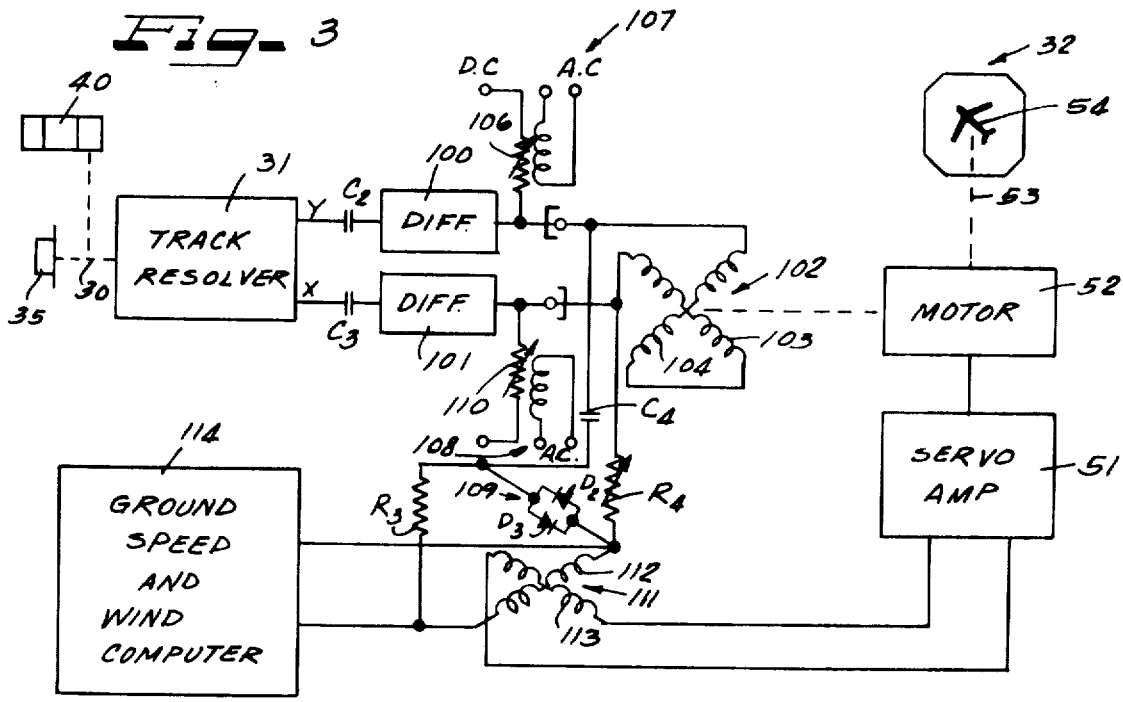
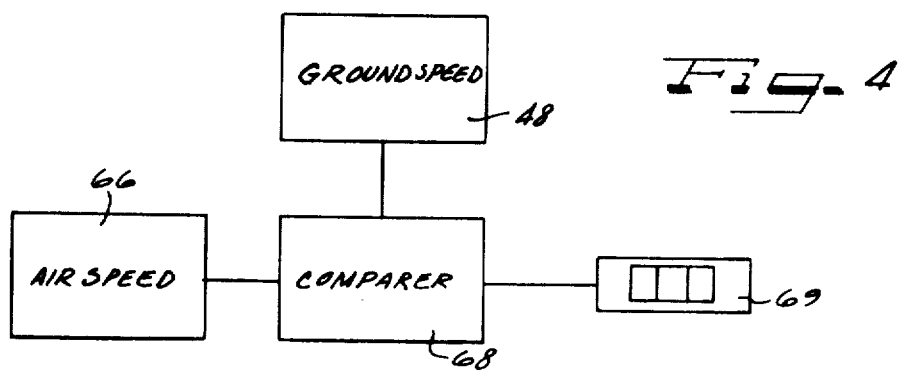
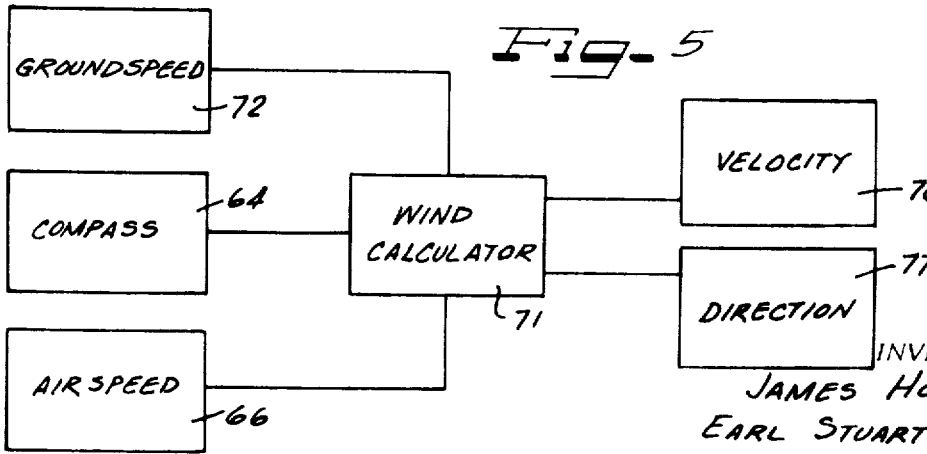

DIRECTION AND GROUND SPEED COMPUTER

CROSS-REFERENCE TO RELATED APPLICATION

This invention is an improvement of the invention entitled "Aircraft Navigation System," filed May 31, 1966, U.S. Ser. No. 559,650, now U.S. Pat. No. 3,414,901 in which the inventors are Earl S. Perkins and Myron L. Anthony.

BACKGROUND OF THE INVENTION 1. Field of the Invention

This invention relates in general to aircraft navigation computers and in particular to a system which has a way point computer that produces X and Y distance outputs. The apparatus of this invention converts the distance outputs into velocity components and combines them to obtain ground speed. The track made good is also calculated. 2. Description of the Prior Art Way point computers for aircraft navigation have been known which receive inputs from DME and VOR receivers and which produce an output which is indicative of the distance and direction to a selected way point.

SUMMARY OF THE INVENTION

The present invention utilizes the outputs of a way point computer to obtain ground speed, track made good and wind information.

The X and Y distance coordinate signals which are produced at the output of the way point computer are differentiated and combined to obtain a resultant signal which is proportional to the aircraft's ground speed. The phase angle between the X and Y velocity signals is indicative of the aircraft track made good.

The major advantages inherent in the system of this invention for obtaining the track made good and ground speed are:

1. The track made good information indicates the actual direction of flight of the craft over the ground rather than the direction in which the keel of the aircraft is pointed. The wind correction is automatically taken care of by the invention. 2. A slaved gyro compass system is not required to provide heating information. 3. The system may be used with helicopters and the actual direction of flight will be presented even if the helicopter is moving backwards or sideways. 4. The ground speed calculated according to this invention is the actual ground speed over the ground and is independent of heading. Ground speed normally obtained from DME is only useful with a way point computer when flying directly away from or toward the DME station whereas in this invention the ground speed is obtained at all times.

Other objects, features and advantages of the present invention will be readily apparent from the following detailed description of certain preferred embodiments thereof when taken in conjunction with the accompanying drawings.

BRIEF DESCRIPTION OF THE DRAWINGS

FIG. 1 is a block diagram of the ground speed and track made good system of this invention;

FIG. 2 is a block diagram of aircraft navigation system according to this invention;

FIG. 3 is a block diagram of a modification of this invention;

FIG. 4 is a block diagram of a system for calculating wind track; and

FIG. 5 is a block diagram for a system for calculating the wind speed and direction.

DESCRIPTION OF THE PREFERRED EMBODIMENTS

FIG. 1 illustrates the aircraft navigation system according to this invention. A VOR receiver 10 supplies an output to an omni-bearing resolver 11 which also receives an input from a DME receiver 12. The omnibearing resolver 11 produces a first output on lead 13 which is proportional to a first coordinate of the aircraft relative to the VOR and DME stations, and a second output on lead 14 which is proportional to a second coordinate of the aircraft and which is at right angles to the first coordinate.

A way point distance potentiometer 16 has a shaft 17 with a knob 18 for setting the distance coordinate of selected way point from the DME and VOR stations which supply radiant energy signals indicative of position such as distance and bearing. An indicator 19 is connected to shaft 17 and indicates the distance from the DME and VOR stations to the selected way point.

The output of the way point distance potentiometer is supplied to a way point bearing resolver 21 which has a shaft 22 with a knob 23 that allows the bearing of the way point from the DME and VOR stations to be set into the system. An indicator 24 indicates the bearing of the way point from the VOR and DME stations.

A first summing amplifier 26 receives an X output on lead 13 from OBI resolver 11 and an X output from the way point bearing resolver 21. A second summing amplifier 27 receives an input from the way point bearing resolver 21 and an input on lead 14 from the omnibearing indicator resolver 11.

The summing amplifier 26 produces an output on lead 28 which is proportional to the X coordinate of the way point relative to the aircraft and the summing amplifier 27 produces an output which is proportional to the Y coordinate of the way point relative to the aircraft.

A track resolver 31 receives the outputs of summing amplifiers 26, 27 and is set to a track angle determined by the setting of a shaft 30 which is connected to the track resolver and which carries a knob 35. An indicator 40 is connected to shaft 32 and indicates the selected track angle. The outputs of the track resolver 31 are proportional to the X and Y coordinates of the selected way point relative to the aircraft. The X and Y outputs are proportional to the aircraft's position with respect to a coordinate system which has its origin at the selected way point and has its Y axis rotated with respect to magnetic north by an angle equal to the selector track angle.

An indicator 32 has a horizontal indicator 33 which is controlled by meter movement 34 that receives the Y output of the track resolver 31. Vertical indicator 36 is controlled by meter movement 37 which receives the X output of the track resolver 31.

The X output of the track resolver 31 is connected to amplifier and detector 38. A differentiator 39 receives the output of the amplifier and detector 38 and produces an output which is proportional to the velocity of the aircraft in the X direction. A modulator 41 receives the output of the differentiator 39 and an input from a reference power supply 42. A resistor R receives the output of the modulator 41. An amplifier and detector 43 receives the Y output of the track resolver 31 and supplies it to a differentiator 14. The modulator 46 receives the output of the differentiator 44 and an input from a 90° phase shifter 47 which receives an input from the 400 hertz reference source 42. A capacitor C receives the output of the modulator 46.

The outputs of the resistor R and capacitor C are connected to point A. A servoamplifier 51 supplies an input to a motor 52. The motor 52 has an output shaft 53 which drives an aircraft indicia 54 which is mounted on the face of the indicator 32 at its center. The shaft 53 supports aircraft 54 so that it may be rotated. For clarity, the aircraft is not shown in its mounted position in FIG. 1. However, FIG. 2 illustrates the aircraft 54 in its correct relationship relative to the instrument.

A resolver 56 has a rotor 57 which is driven by the output shaft 53 of motor 52. Resolver 56 has a stator 58 that is rotatably supported relative to the aircraft. The stator 58 is driven by shaft 30 which is controlled by the track setting knob 35. The resolver rotor 57 supplies a first output to the capacitor C' and a second output to a resistor R'. The outputs of the capacitor C' and resistor R' are connected at point B and supplied to a phase discriminator 49. A switch S₁ has a movable contact 60 which connects the servo amplifier 51 to the output of phase discriminator 49 in a first position. A relay 65 controls the position of the movable contact 60 and when the relay is energized, contact 60 is connected to the output of the phase discriminator 49. When the relay 65 is deenergized, movable contact 60 moves to engage the output of a power supply 70. An amplifier 56 and a rectifier $D_1$ are connected in series with the relay 65 and a point A. The differentiators 39 and 44 convert the displacement signals to velocity signals because the time rate of change of displacement is velocity.

In operation, the navigation system of FIG. 1 continuously indicates the aircraft's ground speed on the indicator 48 and the position of the aircraft indicia indicates the track made good. At point A the output voltages of the two modulators are combined to obtain the ground speed. Simultaneously, the aircraft indicia 54 is rotated to maintain the discriminator 49 output at zero. The motor 52 rotates the aircraft 54 to show the track made good relative to the selected track. The indicator 48 may be a meter movement, a three-synchro digital indicator, a servo-type indicator or a digital indicator of any desired type.

If the track resolver 31 is set to zero degrees or alternatively, if the inputs to the ground speed-heading computer circuitry are taken from the input side of the track resolver, the aircraft indicia 54 will indicate the track made good relative to magnetic North. The position of shaft 53 in this case could be connected to a repeater synchro to indicate the track made good relative to North. If there is no drift angle, the track made good would be the magnetic heading of the aircraft. Thus, when shaft 30 is set to zero, the aircraft may operate without a gyro compass. It is to be realized in area navigation equipment such as described in U.S. Pat. No. 3,414,901 that the pilot establishes the track by movement of a knob after considering the indicator such as in the present application. In the present application, the pilot may set the knob 35 to zero track angle if desired.

In the system of FIG. 1, when the ground speed signal A becomes small, the relay 65 will be deenergized and switch contact 60 will move to engage the contact 80 connected to the power supply 70. When this occurs, the aircraft 54 will rotate continuously. This feature would be particularly useful in a helicopter which may hover with zero ground speed, for example. In conventional aircraft this feature could be utilized as a fail-safe system to indicate that the signal at Point A had decreased below a predetermined value.

FIG. 2 is a block diagram of the navigation system of the invention and illustrates the indicator 32 and the track selector knob 35. The track indicator 40 is mounted on the face of the instrument 32. The aircraft indicia 54 is mounted at the center of the instrument on shaft 53 and the intersection of the horizontal and vertical needles 33 and 36 indicates the way point which is selected by the way point knobs 18 and 23. Indicia 90 and 91 are printed on the face of the instrument 32 at right angles to each other and cross at the center. Indicia 90 and 91 have scale markers for indicating distance. A computer 62 receives inputs from the VOR receiver 10 and DME receiver 12 and comprises in part the structure of FIG. 1. A wind speed and direction indicator 63 is also connected to the computer 62. The computer 62 may also receive inputs from a compass system 64 and an airspeed indicator 66 to compute wind speed and direction, as will be explained hereinafter.

FIG. 3 illustrates modification of the invention for causing the aircraft indicia 54 to rotate when the X and Y velocity signals go to zero.

A differentiator 100 receives the Y signal from track resolver 31 and supplies an output proportional to Y velocity to an input winding 104 of a resolver 102 through a chopper 107. A DC source and potentiometer 106 allow the DC level to be adjusted.

A differentiator 101 receives the X signal from track resolver 31 and supplies an output proportional to X velocity to input winding 103 through chopper 108. A DC source and potentiometer 110 allow the DC level to be adjusted.

A resolver 111 has windings 112 and 113. Servoamplifier 51 is connected to winding 113. Motor 52 receives an input from servo amplifier 51 and drives the resolver 102 and indicia 54 through shaft 53.

Output from ground speed and wind computer 114 is connected across winding 112. A capacitor $C_4$ and resistor $R_3$ are connected in series between winding 112 and winding 104. A potentiometer $R_4$ is connected between windings 112 and 103.

A pair of diodes $D_2$ and $D_3$ are oppositely poled and connected between winding 112 and capacitor $C_4$.

When a helicopter is hovering, limited voltage in the circuit 112 will cause the aircraft indicia 54 to rotate.

FIG. 4, for example, illustrates a comparer 68 which receives an input from the air speed indicator 66 and an input from the ground speed indicator 48. The comparer 68 compares the magnitudes of these signals and indicates their difference on an indicator 69. This difference indicates approximately the wind along track made good. In other words, if the airspeed indicator indicates an airspeed of 300 miles an hour and the ground speed indicator indicates a ground speed of 320 miles per hour, the wind along track made good is approximately 20 miles an hour which will be indicated on the indicator 69.

FIG. 5 illustrates a wind calculator 71 which receives an input proportional to ground speed from a ground speed computer 72 that might be, for example, the apparatus of FIG. 1. The wind calculator 71 also receives an input from the compass 64 and an input from an airspeed indicator 66. The wind calculator 71 calculates the velocity and direction of the wind and supplies them to indicators 67 and 77, respectively. The airspeed vector which may be obtained from an airspeed indicator and the compass may be combined with the ground speed vector to obtain the wind velocity and direction. The calculator 71 contains suitable resolvers and adders for this purpose.

Although minor modifications might be suggested by those versed in the art, it should be understood that we wish to embody within the scope of the patent warranted hereon all such modifications as reasonably and properly come within the scope of our contributions to the art.

The invention claimed is:

1. A navigation system for a craft comprising a way point computer on said craft responsive to radiant energy signals indicative of position information and for computing signals indicative of distance to a selected way point from said craft, differentiating means responsive to said distance signals and connected to said way point computer to produce a signal indicative of the velocities of said craft relative to said way point, an indicator receiving the output of the differentiating means and indicative of the velocity of the craft relative to said way point, a velocity-sensing circuit connected to the output of said differentiating means, and a low velocity indicating means responsive to said velocity sensing circuit for indicating when the velocity of the craft relative to said way point becomes smaller than a predetermined velocity.

2. A navigation system according to claim 1 wherein said low velocity indicating means comprises a motor, an indicia mounted on the output shaft of said motor switch and means for connecting said motor to an energizing source.

3. A navigation system according to claim 2 wherein said indicia is formed in the shape of an aircraft.

4. A navigation system for a craft comprising a way point computer on said craft responsive to radiant energy signals indicative of position information and producing a pair of distance to way point signals which are indicative of the distance coordinates of the craft to the way point, a first differentiating means receiving one of the distance signals from the way point computer and producing a velocity signal relative to a first coordinate, a second differentiating means receiving the other distance signal from the way point computer and producing a velocity signal relative to a second coordinate, and means combining the outputs of the first and second differentiating means for producing a signal which is indicative of the craft's velocity relative to said way point.

5. A navigation system according to claim 4 comprising a first velocity magnitude indicator connected to said combining means to indicate the magnitude of the velocity relative to said way point.

6. A navigation system to claim 5 further comprising a track made good indicator responsive to said combining means for indicating the track made good relative to the selected track.

7. A navigation system according to claim 6 comprising a velocity sensing circuit connected to said combing means, and indicating means connected to said velocity-sensing circuit to indicate when the velocity of the craft relative to said way point becomes smaller than a predetermined velocity.

8. A navigation system according to claim 6 comprising a low velocity sensing circuit connected to said combining means, and means for indicating low velocity connected to said low velocity sensing circuit.

9. A navigation system according to claim 8 wherein said means for indicating low velocity rotates said track made good indicator when the velocity falls below a predetermined value.

10. A navigation system according to claim 9 comprising a motor connected to said truck made good indicator, a power supply, switching means connected to said motor to connect it to the power supply means, and switch actuating means connected to said low velocity sensing circuit to cause said switching means to engage said power supply when the velocity falls below a predetermined value.

11. The method of obtaining the velocity signal of a craft relative to a way point comprising the following steps: computing the craft's distance to said way point from radiant energy signals indicative or position information from a location other then said way point and generating two signals which are proportional to two distances relative to coordinates at right angles to each other, separately differentiating said distance signals to generate the craft's velocity component signals to the way point with respect to said coordinates, and combining the velocity component signals to obtain the craft' velocity signal relative to said way point.

* * * * *